United States Patent

Peltz et al.

[11] 4,099,226
[45] Jul. 4, 1978

[54] CIRCUIT ARRANGEMENT FOR GENERATING A CONTINUOUSLY VARIABLE DC VOLTAGE

[75] Inventors: Guenter Peltz, Emmendinger; Wolfgang Kornberger, Oberwinden, both of Germany

[73] Assignee: ITT Industries, Incorporated, New York, N.Y.

[21] Appl. No.: 766,179

[22] Filed: Feb. 7, 1977

[30] Foreign Application Priority Data

Feb. 28, 1976 [DE] Fed. Rep. of Germany ....... 2608266

[51] Int. Cl.² ........................................... H02M 7/537
[52] U.S. Cl. ..................................... 363/124; 323/19
[58] Field of Search ............... 307/264; 323/19, 22 T; 325/492; 328/228; 334/14, 15; 363/41, 124

[56] References Cited

U.S. PATENT DOCUMENTS

| 3,328,718 | 6/1967 | Murray | 325/492 X |
|---|---|---|---|
| 3,458,820 | 7/1969 | Tashima | 325/492 |
| 3,549,903 | 12/1970 | Lowdenslager | 328/127 X |
| 3,564,394 | 2/1971 | Opal et al. | 307/354 X |
| 3,701,059 | 10/1972 | Nyswander | 307/295 X |
| 3,845,398 | 10/1974 | Katz | 328/128 X |
| 3,914,700 | 10/1975 | Allner | 334/15 X |
| 4,039,981 | 8/1977 | Ohashi et al. | 334/14 |

*Primary Examiner*—William M. Shoop
*Attorney, Agent, or Firm*—John T. O'Halloran; Peter C. Van Der Sluys

[57] ABSTRACT

A constant dc voltage source is connected to the non-inverting input of a differential amplifier with a negative load resistance. The output of the differential amplifier is coupled directly to the inverting input and to a filter circuit for providing a filtered dc signal, the amplitude of which is controlled by a pulse train of variable pulse duty factor connected to the input of an electronic switch which, in response to the pulses, switches the input of the filter circuit between the constant dc voltage and a reference potential.

7 Claims, 1 Drawing Figure

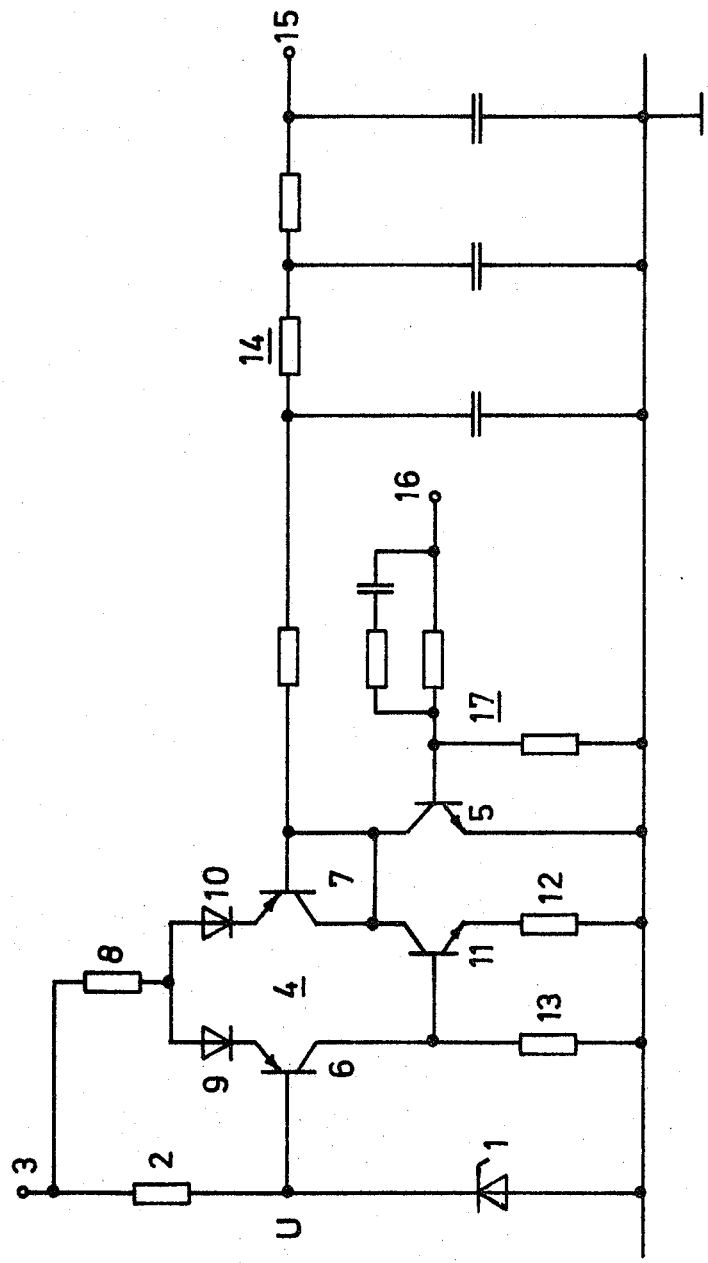

CIRCUIT ARRANGEMENT FOR GENERATING A CONTINUOUSLY VARIABLE DC VOLTAGE

FIELD OF THE INVENTION

The present invention relates to a circuit for generating a continuously variable dc voltage from a constant dc voltage in accordance with a train of pulses having a variable pulse duty factor.

SUMMARY OF THE INVENTION

A continuously variable dc voltage is to be generated by causing an electronic switch controlled by a pulse train of variable pulse duty factor to switch the input of a filter circuit between the terminal voltage of the constant dc voltage source and a reference potential so that the continuously variable dc voltage can be taken from the output of the filter circuit hum-free. As the constant dc voltage source, the voltage across a temperature-compensated zener diode may be used, for example.

Such a circuit arrangement must meet several requirements. It should not load the constant dc voltage source or should load it only constantly. Furthermore, the output resistance of the electronic switch should be the same and low in both states, so the following filter circuit will see a low and constant source impedance. Finally, the continuously variable dc voltage capable of being taken from the output of the filter circuit should be linearly related to the pulse duty factor of the pulse train.

An objective of the present invention is to provide a circuit for generating a continuously variable dc voltage in accordance with a pulse train of variable pulse duty factor pulses.

Another objective of the present invention is to provide a variable dc voltage that is linearly related to the pulse duty factor of the pulse train.

Another objective of the present invention is to provide a circuit for generating a continuously variable dc voltage from a constant dc voltage source without using potentiometer circuits.

Another objective of the present invention is to provide a continuously variable dc voltage source from a constant dc voltage source wherein the constant dc voltage source is not loaded or feeds a substantially constant load.

Another objective of the present invention is to provide a continuously variable dc voltage source that has a low output resistance.

BRIEF DESCRIPTION OF THE DRAWING

The FIGURE illustrating the invention is an electronic schematic diagram.

DESCRIPTION OF THE INVENTION

The preferred embodiment shown in the FIGURE uses for the constant dc voltage source a zener diode 1 connected to a voltage 3 via resistor 2. The zener diode may also be a temperature-compensated zener diode, as mentioned by way of introduction. For the constant dc voltage source, it is also possible to use other devices providing a constant voltage, such as dry batteries, miniature storage batteries, voltage-regulator tubes, etc. In the figure, the constant dc voltage U is taken from the junction of the zener diode 1 and the resistor 2.

According to the invention, the electronic switch for switching the input of a filter circuit 14 between the voltage U and a reference potential consists of a known differential amplifier 4 with negative load resistance (cf. U. Tietze, Ch. Schenk, "Halbleiter-Schaltungstechnik," 2nd Edition, 1971, pp. 154 and 155) and a switching transistor 5 to whose base the pulse train of variable pulse duty factor is applied.

The differential amplifier 4 consists of transistors 6,7 whose emitters are connected to a suitable potential via a common current source; in the figure, the emitters of the transistors 6,7 are connected to the voltage 3 via a resistor 8. The diodes 9, 10 connected between the emitters and the resistor 8 in the direction of the emitter current can be omitted if the constant dc voltage U has small values.

The load resistance of the differential amplifier 4 is formed by a transistor 11 whose collector-emitter junction is inserted in the collector circuit of the transistor 7 and whose base is connected to the collector of the transistor 6, while its emitter is connected to reference potential via a resistor 12. The collector of the transistor 6, too, is connected to reference potential via a resistor 13. The output of the differential amplifier 4 is the collector of the transistor 7, so the base of the transistor 6 is the non-inverting input of the differential amplifier, and the base of the transistor 7 the inverting input.

According to the invention, the non-inverting input of the differential amplifier 4, i.e., the base of the transistor 6, is connected to the constant dc voltage U, while the inverting input, i.e., the base of the transistor 7, is connected directly to the output of the differential amplifier 4, i.e., to the collector of the transistor 7. Coupled to the output is filter circuit 14 which, in the embodiment shown, consists of three RC elements and from whose output terminal 15 a dc voltage can be taken which is variable in the same way as with a potentiometer.

The output of the differential amplifier 4 and, hence, the input of the filter circuit 14 are connected to the collector of the switching transistor 5, whose emitter is at reference potential, which is identical with ground in the embodiment shown. The switching transistor 5 thus connects the output of the differential amplifier 4 with reference potential via its controlled current path. The base of the switching transistor 5 is fed with the pulse train of variable duty factor via the terminal 16. The resistor-capacitor combination 17 in the base circuit serves to improve the switching behavior of the switching transistor if the edges of the variable pulse train are very steep.

The switching transistor 5 may be a bipolar or a field-effect transistor; especially if high repetition rates and steep pulse edges are involved, fast bipolar rf transistors or switching transistors or fast field-effect transistors may be employed.

While, in the figure, the constant dc voltage source is referenced to the same potential as the emitter of the switching transistor 5 and the resistors 12, 13 of the differential amplifier 4, this is not imperative for the operation of the circuit. For example, switching may be effected between the voltage U and any other potential, i.e., the constant dc voltage source and the just mentioned components of the electronic switch may be at different reference potentials.

In a modification of the circuit of the FIGURE, the transistor 7 is replaced by a diode connected in the same direction as the diode 10.

Optimum conditions will be achieved if the quiescent current flowing in that half of the differential amplifier containing the transistors 7, 11, i.e., in the half belonging to the inverting input, is larger, preferably by a factor of 5, than that flowing in the other amplifier half, i.e., in the half belonging to the non-inverting input.

While the embodiment of the FIGURE uses pnp transistors for the differential-amplifier transistors, and npn transistors for the transistor 11 serving as the negative load resistance and for the switching transistor 5, the transistors may also be of the respective other conductivity type, in which case the polarity of the voltage source supplying the differential amplifier must be reversed.

The invention can be used to advantage in varactor-tuned radio and television receivers to generate the variable tuning voltages of the varactor diodes.

What is claimed is:

1. A circuit for generating a continuously variable dc voltage, comprising:
    a differential amplifier of the type that has negative load resistance and an inverting input, a non-inverting input and an output;
    means for connecting the non-inverting input of the differential amplifier to a source of constant dc voltage;
    means for connecting the output of the differential amplifier directly to the inverting input;
    a filter circuit having an input connected to the output of the differential amplifier and an output for providing the variable dc voltage; and
    an electronic switch connected between the output of the differential amplifier and a reference potential, said electronic switch being responsive to a train of pulses having variable pulse duty factor for controllably connecting the output of the differential amplifier to the reference potential.

2. A circuit arrangement as described in claim 1 additionally comprising a constant dc voltage source including a temperature compensated zener diode adapted to be connected to a dc source.

3. A circuit as described in claim 2 wherein the constant dc voltage source is referenced to ground.

4. A circuit arrangement as described in claim 1, wherein the differential amplifier includes two transistors, each of which have an emitter circuit with a diode connected therein and biased in the direction of the emitter current.

5. A circuit arrangement as described in claim 1 wherein the differential amplifier includes first and second current paths, one of which includes a negative load resistance and the quiescent current flowing in the current path having the negative load resistance is approximately five times greater than the current flowing in the other current path.

6. A circuit arrangement as described in claim 1 wherein the electronic switch comprises a bipolar transistor.

7. A circuit arrangement as described in claim 1 wherein the electronic switch comprises a field-effect transistor.

* * * * *